July 12, 1960     E. S. COMPSON     2,944,601
WINDSHIELD COVER
Filed Dec. 5, 1957
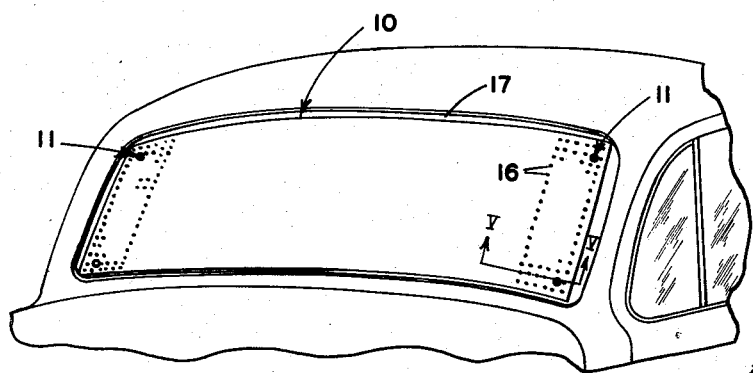
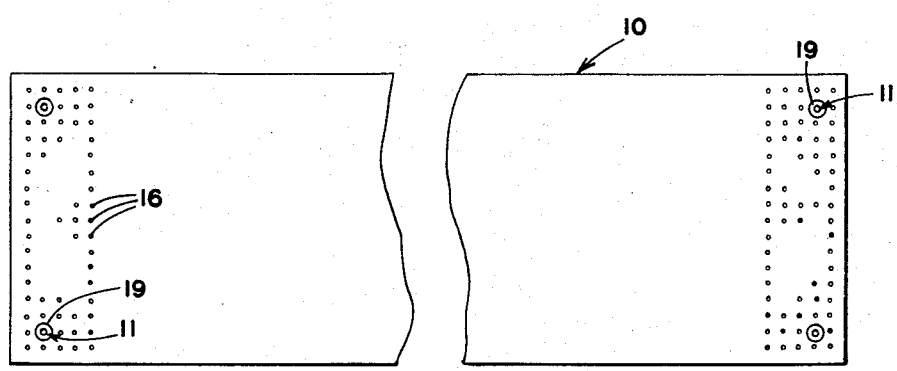
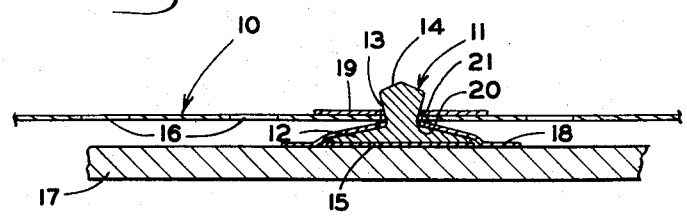
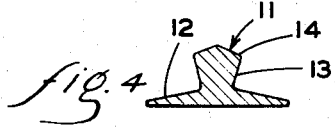
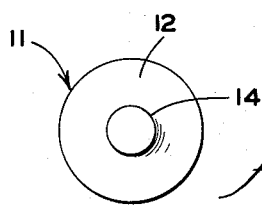
INVENTOR.
*Evo S. Compson*
BY
*Woodhams Blanchard & Flynn*
ATTORNEYS

United States Patent Office 2,944,601
Patented July 12, 1960

2,944,601

WINDSHIELD COVER

Evo S. Compson, 446 Bridge St., Lyons, Mich.

Filed Dec. 5, 1957, Ser. No. 700,915

1 Claim. (Cl. 160—368)

This invention relates to an automative windshield protecting device and particularly to such a device utilizing a plastic material as the protective element and applicable directly to the windshield surface.

The problem of protecting the windshield of a parked car from various forms of accumulations thereon, particularly snow, sleet, sap drippings from trees (which is particularly important in southerly latitudes) and other accumulations, has long been recognized and a variety of expedients have been adopted for affording such protection. However, such previously utilized expedients have, insofar as I am aware, either been too expensive, and/or too inconvenient in use, to be attractive to the general public. Particularly, some of the prior known devices have required the setting of fastening means into the metal surrounding the windshield and this necessitates undesirable drilling into such metal and accordingly is not often used. Other types of devices hold the fastening cords for the windshield cover by clamping them between the door and the jambs adjacent to the door, but this is undesirable in that it is clumsy to operate and is often a danger to the user's fingers. Other devices have relied upon rubber suction cups placed either on the windshield or on the metal adjacent to the windshield but these are undesirably erratic in operation in that they sometimes fail to adhere in place at all and at other times are unreasonably difficult to remove.

Accordingly, a major object of the invention has been to provide a windshield cover which can be easily and quickly applied directly to the windshield with which it is to be used, is capable of being held firmly and smoothly in position and can be quickly and readily removed when desired by the operator of the automobile.

A further object of the invention has been to provide a device, as aforesaid, which will not require drilling of holes in the metal surrounding the windshield, will not require or rely upon a clamping action of the door and the jam adjacent to the door and will not require the use of suction cups, and will yet be of sufficient simplicity that it can be manufactured and sold at a very low price.

A further object of the invention has been to provide a device, as aforesaid, which can, when not in use, be folded into a sufficiently small package that it can be readily carried in the glove compartment of an average automobile without inconvenience.

A further object of the invention has been to provide a device, as aforesaid, which can utilize a transparent material as a windshield cover and therefore permit limited operation of the automobile without removal of such cover.

Further objects and purposes of the invention will be apparent to persons acquainted with devices of this same general type upon reading the following disclosure and inspection of the accompanying drawings.

In the drawings:

Figure 1 is an oblique view of a conventional windshield with cover structure of the present invention applied thereto.

Figure 2 is a plan view of the sheet comprising the windshield cover.

Figure 3 is a plan view of the fastening device by which the sheet is fastened to the windshield.

Figure 4 is a central sectional view of the fastener shown in Figure 3.

Figure 5 is a section taken on the line V—V of Figure 1.

General description

In general, the invention consists of utilizing a molded plastic fastening device 11 having a relatively wide flange 12, a central projecting shank 13 and an enlarged knob 14 on the end of said shank 13. A suitable number, usually four, of such fastening devices 11 are permanently affixed to the corners of the windshield 17 by a suitable adhesive 15 placed between flange 12 and the windshield 17 itself. The covering sheet 10 is provided with a plurality of perforations 16 at each of its ends which perforations are selected and placed over the knobs 14 and onto the shanks 13 of each of said fasteners 11 in a manner to hold the cover sheet 10 tightly around the windshield 17. Preferably, said cover sheet 10 is made of a slightly stretchable, substantially transparent, plastic material, such as polyethylene.

Detailed description

Referring now in more detail to the drawings, attention is first directed to the cover sheet 10 shown in Figure 2. This is cut in a generally rectangular shape and provided with a plurality of perforations 16 adjacent each end. Preferably, the perforations 16 are about an inch apart both longitudinally and transversely of the sheet 10 although this dimension will vary according to the resilience of the plastic material. Particularly, for reasons which will become apparent as the description proceeds, a given pair of holes should be spaced apart a distance no greater than the distance the plastic sheet can stretch at the location, and in the direction, of said pair of holes. Preferably, a form of polyethylene may be utilized, although any plastic sheet which has a suitable resilience and preferably also some transparency, may be used. However, any material which is flexible and stretchable and which can be provided with a large number of openings adjacent its ends without the necessity for reinforcing such openings (as will be in the case of cloth) can be utilized.

The fastening devices 11 of which one is illustrated in Figures 3 and 4, comprises primarily a flange 12, having a shank 13 projecting therefrom, which shank 13 has an enlargement at its outer end. Such fasteners 11 are provided at the corners of the windshield 17 and affixed thereto by any suitable adhesive. Preferably, as shown in Figure 5, a pressure sensitive tape 15, having adhesive on both sides thereof, is placed between the flange 12 of the fastener 11 and the glass of the windshield 17 and the fastener 11 pressed firmly thereagainst. If desired, the fastener 11 can be further reinforced by another piece of pressure sensitive material 18, this time having the adhesive on only one side thereof, as illustrated in Figure 5, which is provided with an opening 20 centrally therethrough. Such adhesive 18 is placed with the opening 20 encircling the shank 13 of the fastener 11 and is large enough so that its periphery extends beyond that of the flange 12. This may then be pressed both against the flange 12 and against the area of the windshield 17 immediately surrounding the flange 12 to assist in holding the fastener 11 firmly against the windshield 17. In order to minimize the obstruction to view through the windshield, it will obviously be desirable to utilize a transparent material for at least this last-named reinforcing member but such is not essential to the minimum practice of the invention.

With the placement of the fastening devices 11 in each of the four corners of the windshield 17, the cover sheet 10 is then placed on the windshield 17 and suitable ones of the several openings 16 at the ends of the cover sheet 10 placed over the four respective fastening devices 11. In order to cause the cover sheet 10 to be stretched firmly against the windshield 17, it will be desirable to select such a one of said openings 16 as required to draw said cover sheet 10 to a suitable degree of tightness. Thus, by spacing the holes as above stated, the plastic material can be stretched enough to secure a tight installation without the necessity of positioning the fastening devices with any particular precision. When this is done, further reinforcing disks 19, having an adhesive on one side thereof and having central openings 21, may be placed with their central openings 21 in register with the selected openings 16 of said cover sheet 10. Here it will be preferable to utilize somewhat non-transparent disks in order that said disks 19 may function both as reinforcing elements and as markers to assist in subsequent use of the cover sheet 10 by rapid and easy indication of the proper openings 16 to place over the fasteners 11 to obtain the right degree of tension on the cover sheet 10.

While it is recognized that the unused ones of the openings 16 at the end of the cover sheet 10 will provide limited access for material, such as snow and sleet, to contact the face of the windshield 17, such access will be of extremely limited character and will be confined to the ends of the windshield 17 and hence will not constitute any appreciable problem.

While the foregoing discussion has assumed that the cover sheet will be applied to a windshield of an automobile, it will be evident that it can be readily also applied to the rear window of an automobile by appropriate placement of fastening devices thereon and appropriate selection of openings by which the cover sheet is applied to such fasteners.

It will also be recognized that, although windshields vary slightly in size from one automobile to another, it will be entirely practical to make the cover sheet sufficient to fit the largest windshield normally encountered and that proper selection of the openings in the end of said cover sheet will enable it to be applied by the car owner readily to any standard automobile windshield without modification or change in either the automobile or the cover sheet or the fastener structure associated therewith.

While it will be apparent that the fastening devices can be made from any suitable material, it should be observed that metallic materials are normally undesirable for this purpose in view of their relatively great thermal expansion as compared to that of the glass comprising the windshield, which expansion has in the past acted to work such fasteners loose from the windshield and render them unacceptable. However, fasteners made from glass, wood, plastic, or other material which has a relatively low thermal expansion, are acceptable.

Inasmuch as the fastening members may be made from any of a wide variety of materials, the term "moldable plastic material" will be utilized in the claims to refer broadly to any non-metallic material having a coefficient of thermal expansion not greatly different from that of glass and capable of being molded by any high production method. Particularly, the fastening devices can be made from glass, synthetic or natural rubber or any synthetic organic plastic material such as a vinyl or a polyethylene, a butyrate and acetate or a cellulose acetate. However, in order to enable the fastening device to conform exactly to the contour of a given windshield, recognizing that windshields have slightly different contours as between those made for different types or models of cars and as between different locations on any given windshield, it will be found somewhat preferable to form at least the windshield contacting portion of the fastening devices from a slightly flexible material, such as a flexible vinyl or a polyethylene.

While a specific embodiment of the present invention has been utilized for the purpose of illustrating same, it should be recognized that numerous variations may be made from the specific form set forth herein without departing from the scope and purpose of the invention and that such variations will be included within the scope of the hereinafter appended claim excepting as such claim may by its own terms expressly provide otherwise.

I claim:

A detachable structure for temporarily covering an automotive windshield, comprising in combination: a plurality of fastening devices, each device including a flange defining a flat wall having a windshield engaging surface, and a shank projecting from said flange in a direction opposite to said windshield engaging surface, said shank having an enlarged, fastening knob at the outer end thereof; pressure sensitive adhesive means secured to said fastening device and applicable to the windshield engaging surface for permanently adhering said fastening device to a selected portion of a windshield; a disk having adhesive material on one side thereof and an opening substantially in the middle thereof, said disk receiving the fastening knob through its said opening and overlying the flange of said fastening device and adapted also to overlie the portion of the windshield immediately surrounding said flange upon said fastening device being applied to said selected portion of the windshield and thereby effecting further holding of said fastening device to said windshield; a cover comprising a rectangular sheet of flexible, resiliently stretchable and transparent polyethylene of approximately the shape and size of the windshield to be covered and having a group of relatively small openings spaced uniformly from each other and dispersed over a large area at one end of said cover, and a similar group of relatively small openings uniformly spaced from each other and dispersed over a large area at the other end of said cover, said openings being slightly larger than said shank and slightly smaller than said knob and receiving said shanks of said fastening devices respectively through selected ones of said openings, the resiliency of said cover sheet being sufficient to permit stretching of said sheet a distance substantially equal to the spacing between adjacent openings, whereby if the fastening devices are placed anywhere upon the windshield in the regions covered by said areas of said cover having said groups of openings therein, the cover can be stretched sufficiently to enable the shank of each of the fastening devices to project through one of said openings and thereby hold said cover snugly against said windshield, said openings being resiliently enlargeable by stretching thereof so that said knobs may pass therethrough and said openings may thereafter return to their original size so that said cover releasably engages said shanks.

References Cited in the file of this patent

UNITED STATES PATENTS

| 1,467,766 | Meadows | Sept. 11, 1923 |
| 2,489,901 | Kocinski | Nov. 29, 1949 |
| 2,551,052 | Quish et al. | May 1, 1951 |
| 2,646,118 | Berty | July 21, 1953 |